(12) United States Patent
Jung et al.

(10) Patent No.: US 7,673,544 B2
(45) Date of Patent: Mar. 9, 2010

(54) SEPARATION AND RECEIVING DEVICE FOR SPENT NUCLEAR FUEL RODS

(75) Inventors: Jaehoo Jung, Daejeon (KR); Jisup Yoon, Daejeon (KR); Younghwan Kim, Daejeon (KR); Jaehyun Jin, Daejeon (KR); Donghee Hong, Daejeon (KR)

(73) Assignees: Korea Atomic Energy Research Institute, Daejeon (KR); Korea Hydro & Nuclear Power Co., Ltd., Seoul (KR)

( * ) Notice: Subject to any disclaimer, the term of this patent is extended or adjusted under 35 U.S.C. 154(b) by 431 days.

(21) Appl. No.: 11/316,850

(22) Filed: Dec. 22, 2005

(65) Prior Publication Data

US 2007/0092054 A1   Apr. 26, 2007

(30) Foreign Application Priority Data

Oct. 26, 2005   (KR) .................... 10-2005-0101531

(51) Int. Cl.
G21C 19/36   (2006.01)
G21C 19/34   (2006.01)

(52) U.S. Cl. ............................. 83/102; 83/54; 83/167; 83/425; 83/924; 83/930; 976/DIG. 273; 976/DIG. 274

(58) Field of Classification Search ............... 30/90.1, 30/90.4, 90.6–90.9; 83/407, 425, 408, 89, 83/102, 167, 102.1, 105, 924, 54, 930, 425.1; 29/273, 723; 976/DIG. 273, DIG. 274; 241/68
See application file for complete search history.

(56) References Cited

U.S. PATENT DOCUMENTS

| 193,959 | A | * | 8/1877 | Howard ....................... 99/545 |
| 1,556,053 | A | * | 10/1925 | Warren et al. ................. 99/538 |
| 2,046,341 | A | * | 7/1936 | McParlin ...................... 83/107 |
| 2,288,670 | A | * | 7/1942 | Babiary ...................... 30/90.7 |
| 3,156,394 | A | * | 11/1964 | Alles et al. .................... 225/94 |
| 3,173,320 | A | * | 3/1965 | Guilloteau et al. ............ 83/102 |
| 3,831,248 | A | * | 8/1974 | Duncan et al. ............. 29/564.3 |

(Continued)

FOREIGN PATENT DOCUMENTS

EP   0169629   *   4/1985

(Continued)

OTHER PUBLICATIONS

Korean Radioactive Waste Society, "Study for Slitting of Spent Nuclear Fuel," Abstracts of Proceedings of Korean Radioactive Waste Society Spring Meeting, Jun. 23 to 24, 2005, pp. 404-405.

Primary Examiner—Boyer D. Ashley
Assistant Examiner—Laura M. Lee
(74) Attorney, Agent, or Firm—Ladas & Parry LLP

(57) ABSTRACT

Disclosed is a separation and receiving apparatus for a spent nuclear fuel rod. The spent nuclear fuel rod is mounted and downwardly transferred by a pin. At this time, a blade peels the hull of the spent nuclear fuel rod. The hull and a pellet positioned therein are separated by a separator. The peeled hull and pellet are each received in respective receiving vessels. Accordingly, since the hull and pellet made of uranium oxide ($UO_2$) may be automatically separated and received in each respective vessel, safety and automation may be guaranteed.

19 Claims, 7 Drawing Sheets

U.S. PATENT DOCUMENTS 4,290,906 A * 9/1981 Saito et al. .................. 376/260
4,528,435 A * 7/1985 Billon-Pierron et al. .. 219/69.17
5,809,849 A * 9/1998 Coffey et al. ................ 81/9.51
6,276,250 B1 * 8/2001 Ayling et al. .................. 83/885
7,143,969 B2 * 12/2006 Yamada et al. ................ 241/69

FOREIGN PATENT DOCUMENTS

GB 2134018 * 8/1984

* cited by examiner

SEPARATION AND RECEIVING DEVICE FOR SPENT NUCLEAR FUEL RODS

CROSS-REFERENCE TO RELATED APPLICATIONS

This application claims the benefit of Korean Patent Application No. 10-2005-101531, filed on Oct. 26, 2005, in the Korean Intellectual Property Office, the disclosure of which is incorporated herein in its entity by reference.

BACKGROUND OF THE INVENTION

1. Field of the Invention

The present invention relates to a separation and receiving apparatus for a spent nuclear fuel rod, and more particularly, to a separation and receiving apparatus for separating a hull and a pellet from a spent nuclear fuel rod, capable of effectively and automatically separating and receiving a hull and a pellet made of uranium oxide ($UO_2$), while security and automation being guaranteed.

2. Description of the Related Art

Nuclear fuel is a material capable of producing energy by entering a nuclear reactor and causing a chain reaction of nuclear fission. Spent nuclear fuel is the material left after the nuclear fission. Generally, uranium 235 $^{235}U$•uranium 233 $^{233}U$•plutonium 239 $^{239}Pu$ and the like is a representative as material used for nuclear fuel. Uranium 235 $^{235}U$ is contained in only 0.7% of natural uranium. Accordingly, in the case of using natural uranium, the amount needed for reaching critical mass increases. Also, light water strongly absorbing neutrons may not be used as a moderator. Accordingly, the capacity of a nuclear reactor becomes large. Consequently, a lot of nuclear reactors use enriched uranium which artificially increases the ratio of uranium 235 $^{235}U$ as fuel material. In particular, a reactor for ship propulsion needing minimization or an electricity generating reactor limited by building cost per a certain output usually uses enriched uranium.

Nuclear generation is to slowly react the nuclear fuel in a reactor, generate thermal energy, and generate electricity by using the generated thermal energy. Nuclear generation uses nuclear fuel such as natural uranium that is enriched to between about 3 and 5%. When new fuel is added into a reactor, the fuel is burnt for about three periods to generate thermal energy. When one period is terminated, the reactor is stopped and a third of fuel is replaced. In this case, one period is about 18 months for which nuclear fuel is put in a reactor and generates energy through nuclear fission. When one period is over, equipment comprising a power plant such as a turbine or a steam turbine, a generator, all types of valves, a pump, etc. receive maintenance. When the maintenance is completed, the power plant is restarted and generates electricity for the next period, 18 months.

In this instance, nuclear fuel undergoes fission in a reactor in the form of being contained in a nuclear fuel rod. In this instance, the nuclear fuel rod is about 10 mm in diameter and about 4 m in length. A stable, corrosion-resistant zirconium alloy, for example Zircaloy, that is about 1 mm in width. Hull caps are provided on both sides of the hull to be capable of being sealed by resistance welding or the like.

Fuel manufactured in the form of a pellet is loaded into the hull of each nuclear fuel rod and tens to millions of nuclear fuel rods manufactured as above are used in a bundle for nuclear fuel used for nuclear power generation. According to a conventional method, spent nuclear fuel burnt in a nuclear power plant is stored in a tank without being processed. However, the longer the period of nuclear power generation, the more an amount of spent nuclear fuel accumulates. Consequently, a huge storage space is needed. Also, the necessity and dangerousness of disposing the accumulated nuclear wastes remains. In some countries, spent nuclear fuel rods are transferred to a permanent disposal area to be stored for the long term. On the other hand, nuclear fuel may be separated from the hull for recycling the spent nuclear fuel.

To recycle or to dispose of nuclear fuel, a nuclear fuel rod is dismembered to separate the nuclear fuel and the hull after the nuclear fuel is completely used in a reactor. However, in the case of separating nuclear fuel from a hull by using a current technology, nuclear fuel materials such as solid uranium, plutonium, or the like, nuclear fission products, and hull materials remain in the hull. The hull is classified as high-level radioactive waste. In particular, in the case of separating nuclear fuel from a hull by using wet processing, high-level radioactive waste such as a nuclear fuel a liquid cleaning solution and the like are spread on the inner surface and the outer surface of the hull. Accordingly, more special processing is needed.

Two methods are generally used for the management of spent nuclear fuel. One is a method of putting spent nuclear fuel in a rock bed in the ground to a depth of more than 500 meters and thoroughly isolating the spent nuclear fuel from the human ecosystem. This is known as permanent disposal. The other is a method of separating recyclable materials from spent nuclear fuel (this is referred to as 'reprocessing'), reusing the separated nuclear fuel materials, and permanently disposing of high-level radioactive waste.

In particular, a spent nuclear fuel rod is cut to about 25 cm in length. The cut spent nuclear fuel rod is transferred to a disposal area such as a hot cell by a robot and a slitting operation for separating a pellet and a hull is performed. In this instance, a heating device is provided to supply the high heat of reaction to the inside of a vertical reactor in order to separate a hull and a fuel rod in the form of a pellet in the conventional method. In this instance, the heating device is in the shape of a cylinder wrapping the outside of the vertical reactor. Also, a vertical screw is provided in the vertical reactor and splits the hull through a complicated mechanical mechanism. Accordingly, it takes a long time to complete the operation.

Also, the complicated structure makes manufacturing difficult and increases manufacturing cost. Also, the manipulation of the complicated structure prolongs the operation time. Namely, since the introduction of automation processing becomes difficult and a handle or the like has to be manually manipulated, the operation efficiency decreases.

Also, it is difficult to secure the safety of the process because of a complicated driving method and complicated processing. Also, it is very inconvenient to separate a hull and a pellet contained in the same vessel.

SUMMARY OF THE INVENTION

To solve the aforementioned problems, the present invention provides a separation and receiving apparatus of a spent nuclear fuel rod, which can be easily manufactured because of its simple structure, and effectively separate a hull and a pellet.

The present invention also provides a separation and receiving apparatus of a spent nuclear fuel rod, which can be easily automated, improve operation efficiency because of the shortened operation time, and have enhanced reliability for operation.

The present invention also provides a separation and receiving apparatus of a spent nuclear fuel rod, which can safely separate a hull and a pellet that is spent nuclear fuel and automatically receive the separated pellet and hull in respectively different vessels without another process for separating.

To achieve the above objectives, according to the present invention, there is a separation and receiving apparatus of a spent nuclear fuel rod, in which a pin moving by a driving unit downwardly presses the spent nuclear fuel rod, a plurality of blades provided below the pin peels the hull of the nuclear fuel rod in the lengthwise direction, and a separator provided below the blade separates the hull and a pellet positioned therein, and the separated hull and pellet are received in each vessel.

The blade includes blade modules provided with the plurality of blades located according to the transfer direction of the nuclear fuel rod, the blade modules provided in plurality around the blade body. In this instance, it is preferable that there are 3 blade modules and are provided to the blade body at intervals of 120 degrees and the said each blade module is provided with four blades.

The separator is in the shape of a cone and provided with a pellet passing hole in its center to pass the pellet, and a hull guide guiding the hull cut within the blade module and the hull guide is inwardly caved in from the outside of the separator.

The vessels include a hull vessel provided below the separator and capable of receiving the hull; and a pellet vessel provided in a center of the hull vessel and receiving the pellet passing through a pellet passing hole formed in the center of the separator. In this instance, a hull passing hole is formed on a side of the pellet vessel to pass and receive the hull in the hull vessel.

As described above, the separation and receiving apparatus of the present invention may be easily manufactured because of its simple structure. Also, a pellet and a hull may be automatically separated. Namely, the present invention may contribute to shortening of operation time and effective and stable management of spent nuclear fuel.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the accompanying drawings. However, the present invention is not limited to the embodiments or restricted thereby.

Figure 1:
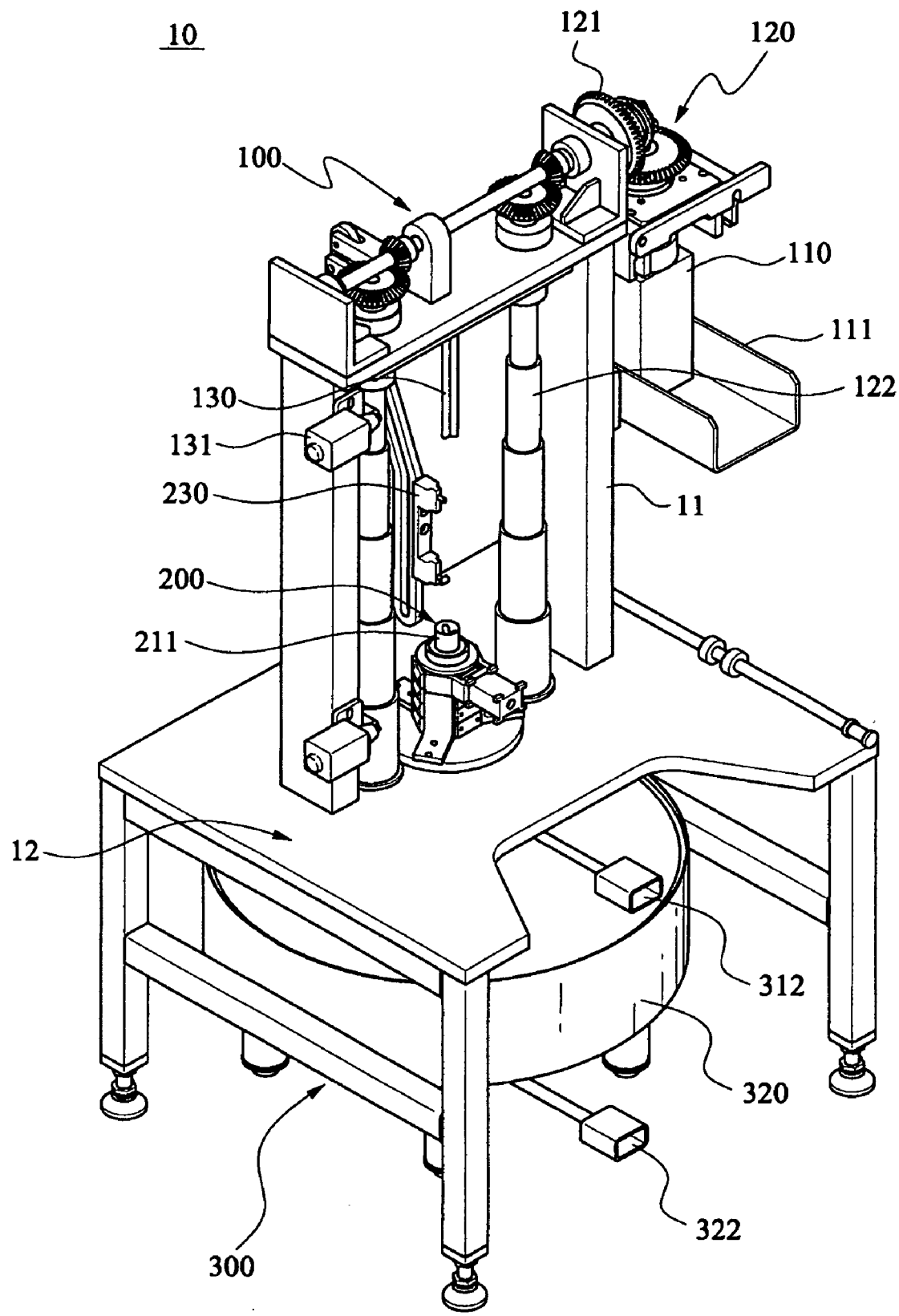
FIG. 1 is a perspective view illustrating a separation and receiving apparatus of a spent nuclear fuel rod according to the present invention.
Figure 2:
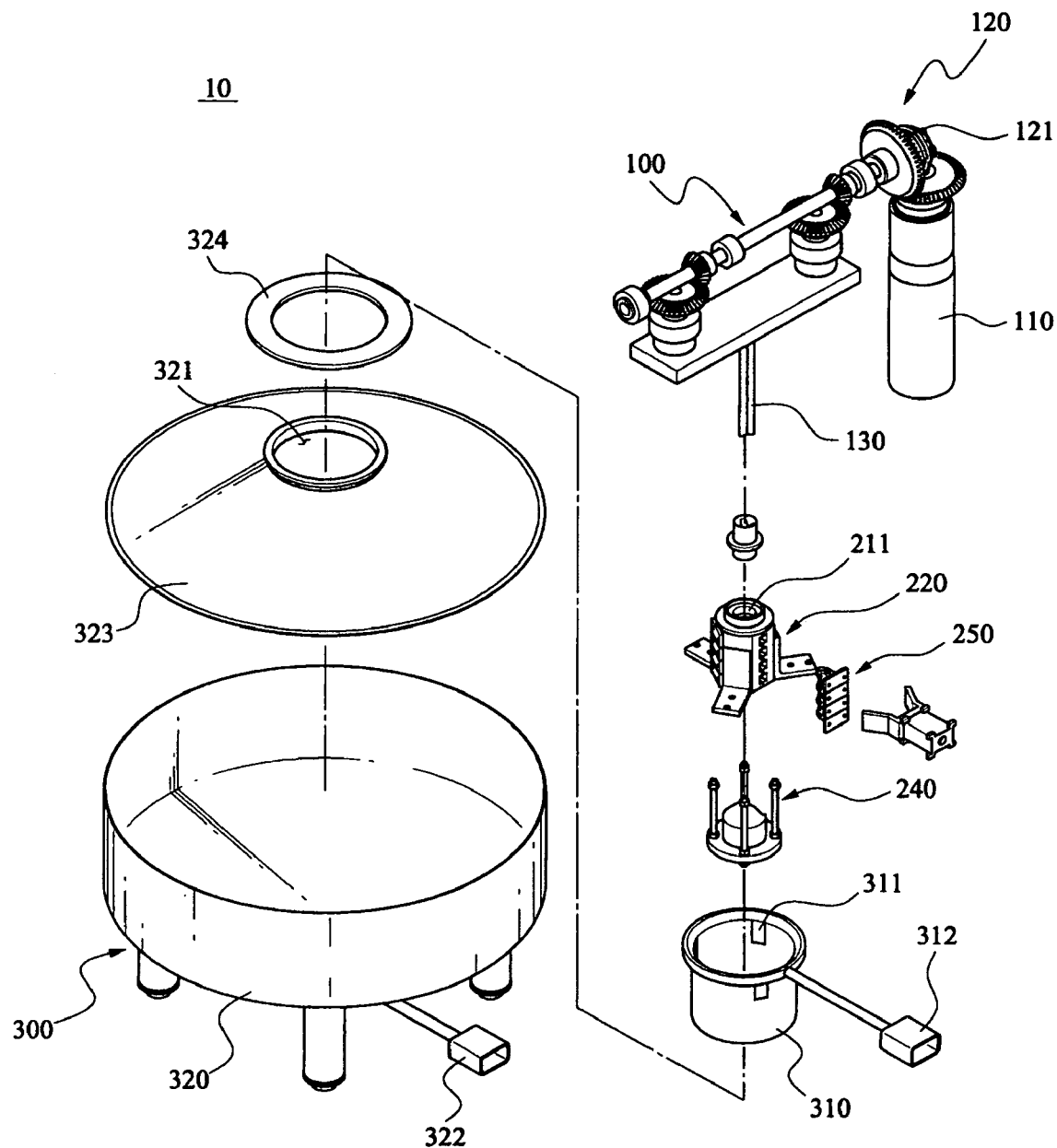
FIG. 2 is an exploded perspective view illustrating a separation and receiving apparatus of a spent nuclear fuel rod according to the present invention.

FIG. 1 is a perspective view illustrating a separation and receiving apparatus of a spent nuclear fuel rod according to the present invention, and FIG. 2 is an exploded perspective view illustrating a separation and receiving apparatus of a spent nuclear fuel rod according to the present invention. As illustrated in the figures, a separation and receiving apparatus 10 of a spent nuclear fuel rod includes a driving unit 100, a slitting unit 200 and a receiving unit 300. The present invention will first describe the configuration of the driving unit 100, the slitting unit 200 and the receiving unit 300, and subsequently describe in detail operations thereof.

The driving unit 100 includes a motor 110, a driving power transfer unit 120 and a pin 130. The driving power transfer unit 120 is connected to the motor 110 to transfer the driving power. The pin 130 is connected to the driving power transfer unit 120 to be capable of pressing a spent nuclear fuel rod. A spent nuclear fuel rod is used in the form of a fuel rod. The present invention accepts fuel rods cut in certain lengths.

The motor 110 is placed on a motor support 111. The motor support 111 is attached to a vertical pole 11 of the separation and receiving apparatus 10. The motor 110 is supplied with power and converts electric energy into rotational motion/movement. Besides direct current and alternating current motors, the motor 110 may also include a motor activated by hydraulic pressure.

The driving power transfer unit 120 includes a plurality of gears 121 connected to the motor 110, and a ball screw 122 connected to the gear 121 to transfer the driving power to the pin 130. The gears 121 are provided on both sides of the pin 130 and connected to the pin 130. In this instance, the gears 121 function to transfer driving power to the ball screw 122 transferring the driving power to the pin 130. The gear 121 includes a bevel gear and the like. The driving unit 100 functions to push down the pin 130 to press a cut spent nuclear fuel rod. The operation thereof will be described in detail later. A limit switch 131 is provided on one side of the vertical pole 11 to be capable of instantaneously stopping the driving unit 100. Accordingly, when the limit switch 131 is pressed, the driving unit 100 is immediately stopped.

The slitting unit 200 will be described. The slitting unit 200 includes a blade portion 220 provided with a nuclear fuel rod guide 211 passing a cut spent nuclear fuel rod in its center and having a plurality of blades around the nuclear fuel rod guide 211 to peel the hull formed of the surface of the nuclear fuel rod; a nuclear fuel rod support 230 supporting the nuclear fuel rod placed in the nuclear fuel rod guide 211; and a separator 240 connected to the blade portion 220 and separating the peeled hull and the pellet positioned therein.

Figure 3:
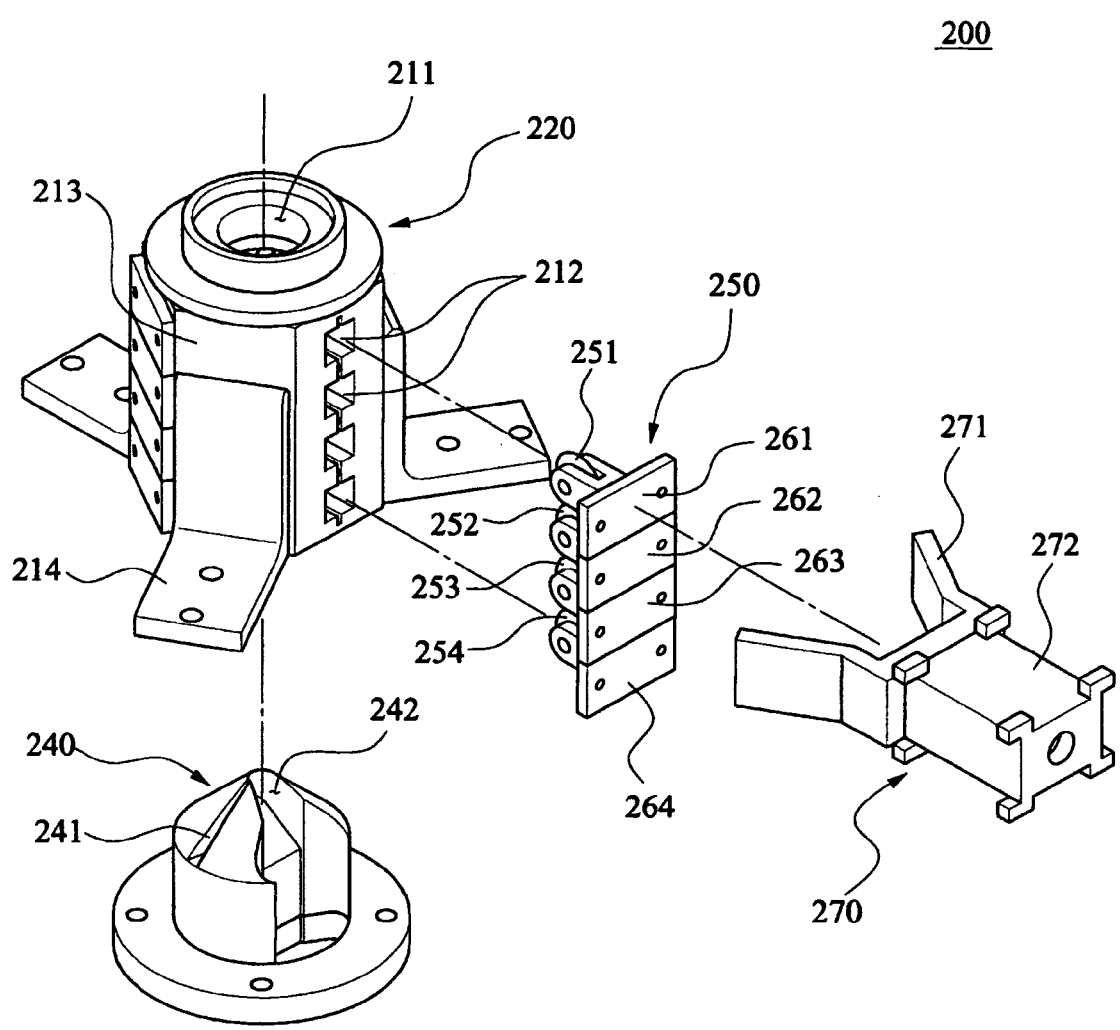
FIG. 3 is an exploded perspective view illustrating a blade portion and a separator according to the present invention.

First, the blade portion 220 will be described with reference to FIG. 3. FIG. 3 is an exploded perspective view illustrating a blade portion and a separator according to the present invention.

As illustrated in the figure, the blade portion 220 includes a blade body 213 and a supporting plate 214 fixing the blade body 213 to a table 12. The blade body 213 is provided with the nuclear fuel rod guide 211 in its center and an insertion hole 212 where the blades 250 are inserted in its side.

The blade body 213 is nearly in the shape of a cylinder. The nuclear fuel rod guide 211 is formed to pass through the inside of the blade body 213 and in the shape of a cylinder that is the same as the shape of a cut spent nuclear fuel rod. The supporting plate 214 may be connected to the table 12 by using various methods such as bolts, rivets, welding, and the like.

The blades 250 are inserted in an insertion hole 212. Also, the blades 250 are constructed to be exposed within the nuclear fuel rod guide 211 to be capable of cutting the hull of a spent nuclear fuel rod passing through the nuclear fuel rod guide 211. The blades 250 are provided in plurality. In the present embodiment, the blades 250 are four. Namely, the blades 250 include a first blade 251, a second blade 252, a third blade 253, and a fourth blade 254. This is the order of which they are positioned in, from the most upper portion and first contacting a nuclear fuel rod. While contacting the fuel rod in the determined order, the first, second, third, and fourth blades 251, 252, 253, and 254 sequentially scratch and cut the hull. The first, second, third, and fourth blades 251, 252, 253, and 254 form one blade module. The blade module is attached to the blade body 213 at intervals of 120 degrees and cuts the hull in the lengthwise direction. The blades are provided in plurality. A blade first contacting the hull of the nuclear fuel rod forms regularly spaced guide grooves on the external surface of the hull and subsequent blades peel according to the guide grooves.

Each of the first, second, third, and fourth blades 251, 252, 253, and 254 is rotatably attached to each of blade mounting plates 261, 262, 263, and 264. In this instance, the blade mounting plates 261, 262, 263, and 264 may be provided with a blade knob 270 protruded on their outside. The blade knob 270 includes a combination portion 271 attachable to the blade body 213 and a knob portion 272 connected to the combination portion 271 of the blades 251, 252, 253, 254. The blade knob 270 is used for separating the first, second, third, and fourth blades 251, 252, 253, and 254 when replacing or repairing the same by using a robot or a manipulator.

The separator 240 functions to separate a hull and a pellet from a nuclear fuel rod. A hull cut at intervals of 120 degrees by a blade module provided at intervals of 120 degrees is outwardly split apart and discharged from a hull guide 241. Namely, the separator 240 is in the shape of a cone and provided with a pellet passing hole 242 in its center to pass the pellet, and a hull guide 241 capable of guiding the cut hull may be inwardly caved in the outside of the separator 240 or outwardly protruded. Accordingly, the hull guide 241 guides a hull to a hull passing hole 311.

A hull cut in the blade portion 220 is outwardly separated from the separator 240 via the hull guide 241 and received in a receiving unit. Also, a pellet is separated via the pellet passing hole 242 formed in the center of the separator 240 and received in a receiving unit 300.

Figure 4:
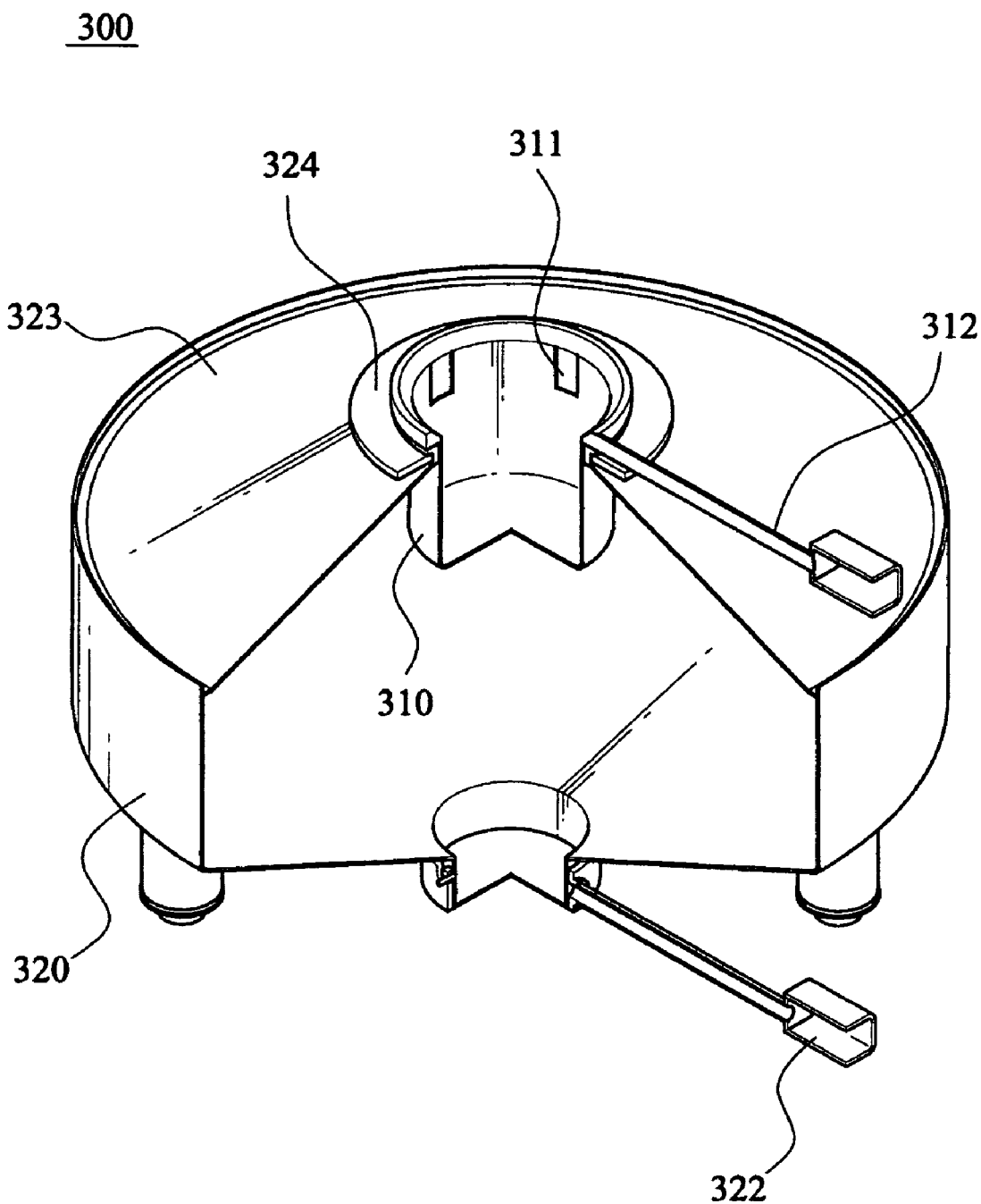
FIG. 4 is a cross-sectional perspective view illustrating a portion of a receiving unit.

The receiving unit 300 will be described with reference to FIG. 4. FIG. 4 is a cross-sectional perspective view illustrating a portion of a receiving unit.

As illustrated in the figure, a hull vessel 320 is provided below the separator 240 to be capable of receiving the hull, and a pellet vessel 310 is provided in the center of the hull vessel 320 to receive the pellet. In this instance, the pellet vessel 310 is hung over a hole for the pellet vessel 321 of an upper cover 323. The upper cover 323 is provided on the top of the hull vessel 320. A disk-shaped ring member 324 is interposed between the pellet vessel 310 and the upper cover 323.

Three hull passing holes 311 are formed on the side of the pellet vessel 310 at intervals of 120 degrees. Also, a knob 312 is provided on one side of the pellet vessel 310 to ease separation and transfer by using a robot or a manipulator. Also, for the same reason, a knob 322 is provided below the hull vessel 320. A hull peeled in the blade portion 220 passes through the hull passing hole 311 via the hull guide 241 and is received in the hull vessel 320. A pellet separated in the blade portion 220 passes through the pellet passing hole 242 of the separator 240 and is received in the pellet vessel 310.

Figure 5:
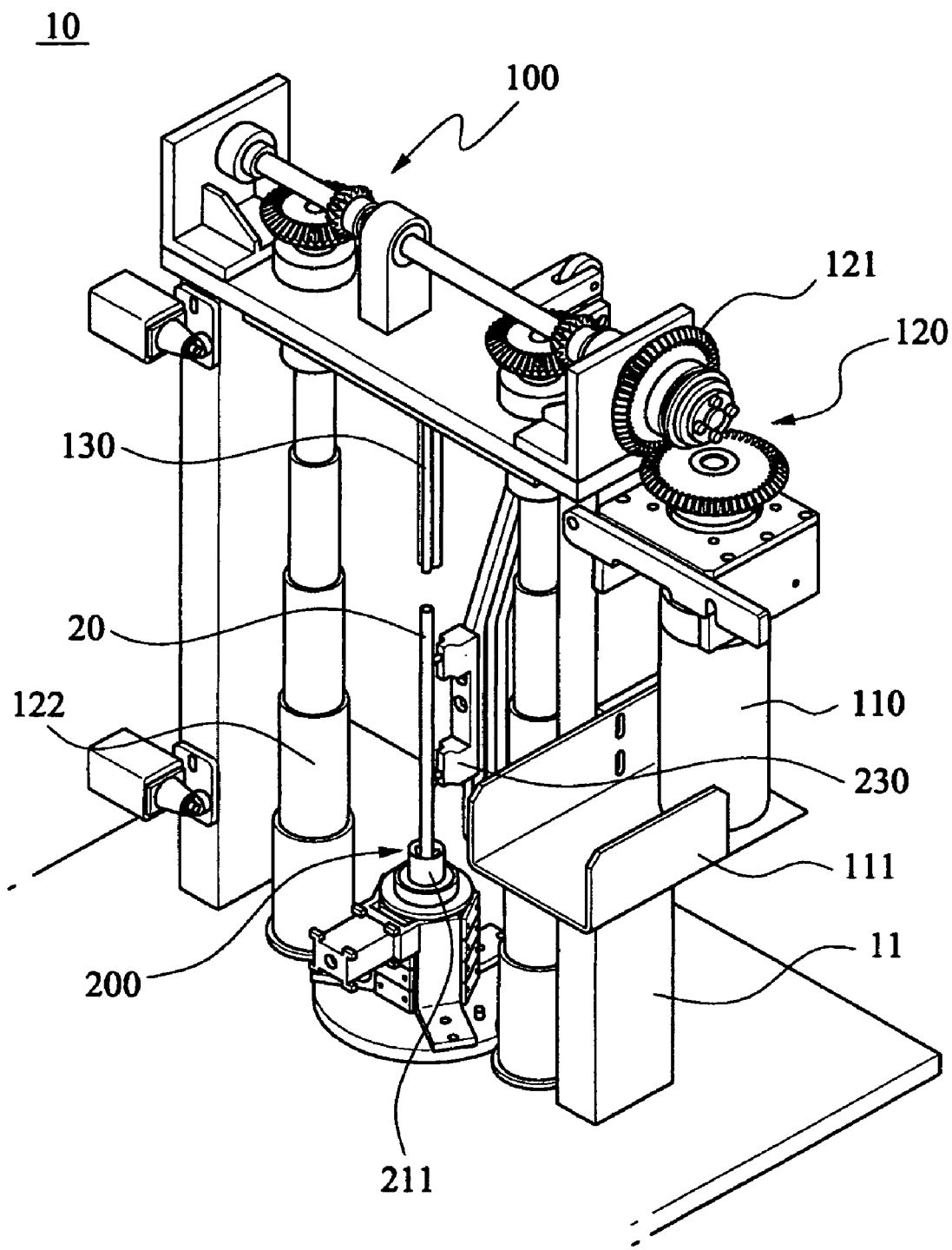
FIG. 5 is a perspective view illustrating a mounted spent nuclear fuel rod.
Figure 6:
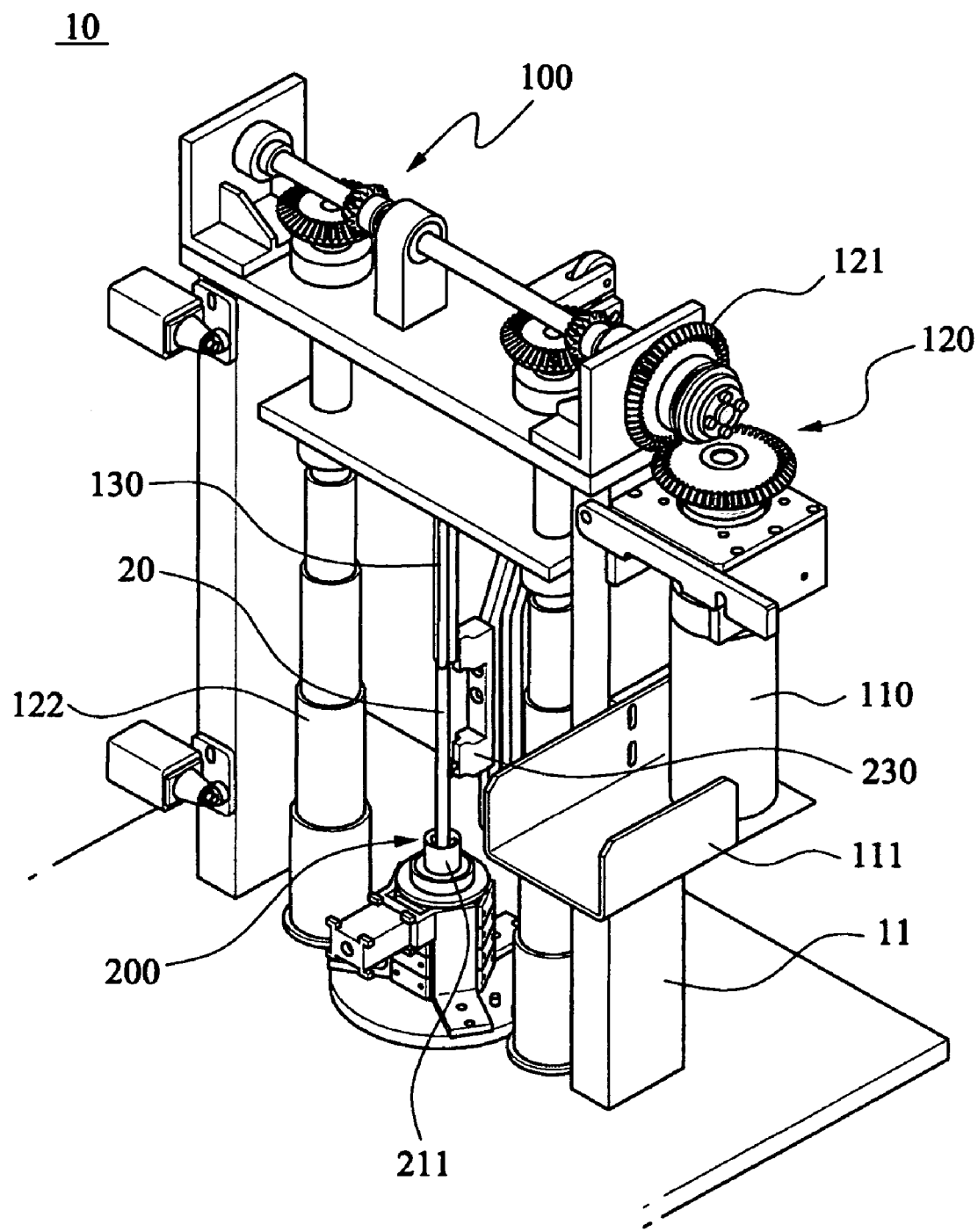
FIG. 6 is a perspective view illustrating a pin pressing a spent nuclear fuel rod.

Hereinafter, operations and effects of a separation and receiving apparatus of a spent nuclear fuel rod will be described. FIG. 5 is a perspective view illustrating a mounted spent nuclear fuel rod and FIG. 6 is a perspective view illustrating a pin pressing a spent nuclear fuel rod.

As illustrated in the figures, one spent nuclear fuel rod 20 cut to about 25 cm is mounted in the nuclear fuel rod guide 211. The spent nuclear fuel rod 20 may be transferred and attached by using a robot or a manipulator. Also, the spent nuclear fuel rod 20 may be configured to be automatically attached via some other device.

When the motor 110 is driven, driving power is transferred to the pin 130 via the driving power transfer unit 120 including the gear 121 and the ball screw 122. The pin 130 presses the spent nuclear fuel rod 20 while slowly descending because of the driving power. In this instance, the spent nuclear fuel rod 20 is cut to about 25 cm and slowly descends by the pressing of the pin 120. The nuclear fuel rod support 230 is separated from the spent nuclear fuel rod 20 while slowly moving apart therefrom.

While the dropped spent nuclear fuel rod 20 is passing through the nuclear fuel rod guide 211 formed in the blade portion 220, a hull positioned on the outside is peeled by the first, second, third, and fourth blades 251, 252, 253 and 254. The first blade 251 functions only to help the second blade 252 to easily cut through. Also, while the spent nuclear fuel rod 20 is passing through the third and fourth blades 253 and 254 in succession, the hull is peeled.

As described above, the first, second, third, and fourth blades 251, 252, 253 and 254 form one blade module, which is provided to the blade body 213. Since three of the blades modules are provided to the blade body 213 at intervals of 120 degrees, the hull is peeled at an interval of 120 degrees by the blade modules. The peeled hull and a pellet positioned in the hull are transferred to the separator 240.

Figure 7:
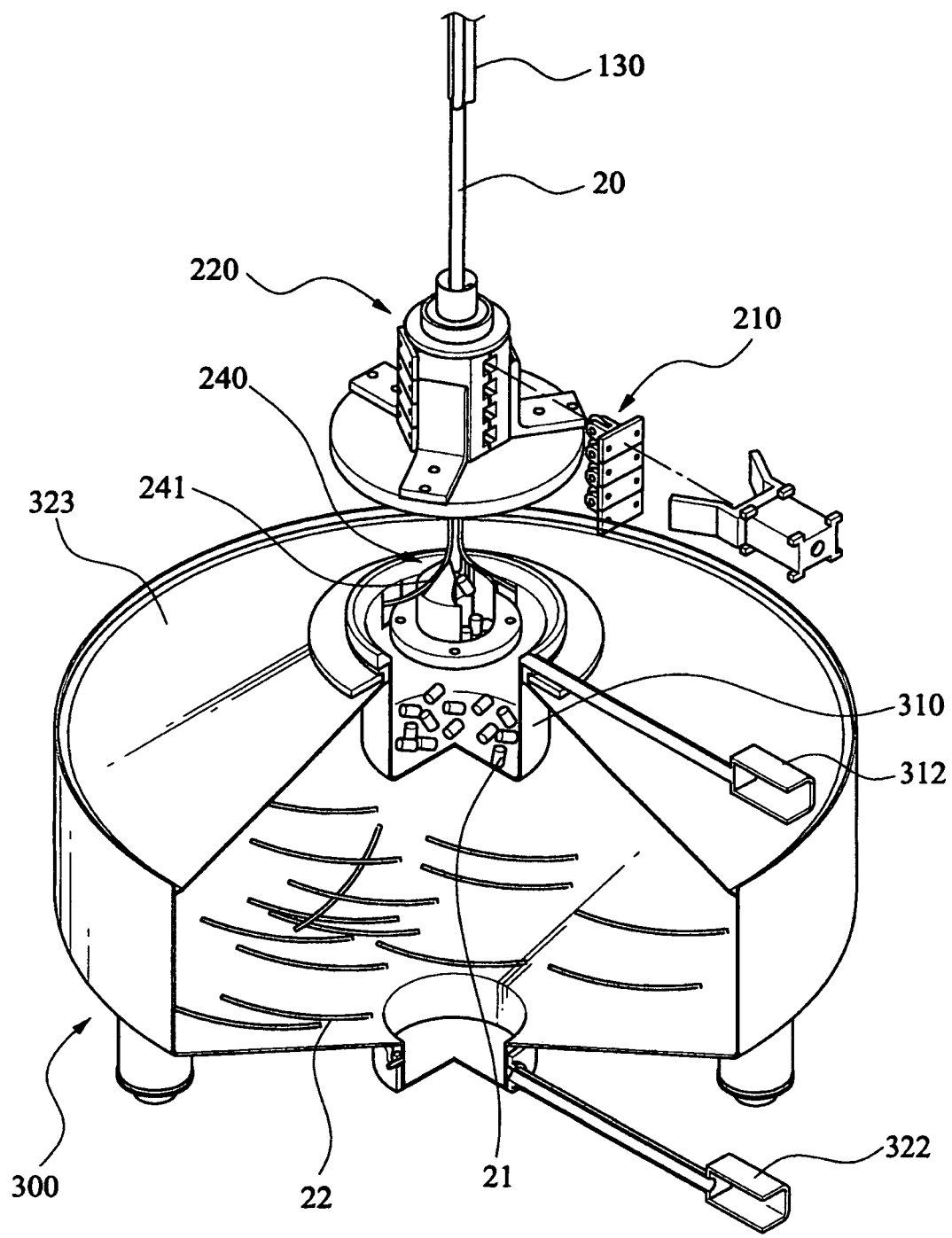
FIG. 7 is a perspective view illustrating a hull and a pellet separated from a spent nuclear fuel rod.

FIG. 7 is a perspective view illustrating a hull and a pellet separated from a spent nuclear fuel rod. As illustrated in the figure, in the case of a hull 22 and a pellet 21 transferred to the separator 240, while the hull 22 peeled by the hull guide 241 is outwardly cracked apart, the hull 22 passes through the hull passing hole 311 refer to FIG. 4 or add to FIG. 7 and is received in the hull vessel 320. Also, the pellet 21 passes through the pellet passing hole 242 provided in the center of the separator 240 and is received in the pellet vessel 310.

When the above separating operation is completed, the received pellet 21 is stored or transferred for subsequent processing by using the knob 312 via a robot or a manipulator. Also, the hull 22 is stored in another vessel or transferred for subsequent processing by using the knob 322 of the hull vessel 320.

Namely, a hull and a pellet are automatically received in respectively different vessels. Accordingly, it is not only safe but also separates precisely. This may improve the reliability of operations. Also, since operation time is shortened, operation efficiency is improved.

Accordingly, the present invention may simplify manufacturing operation because of its simple structure and automatically separates a pellet and a hull.

Also, since the separation and receiving is automatically performed, the present invention does not need separate operation processes for the separation and receiving. Also, since a hull and a pellet are each received in separate vessels, the safety and reliability of operation may be improved.

Also, the present invention adopts an automation method instead of a conventional manual method. Accordingly, the present invention may contribute to shortening of operation time and safe and efficient management of spent nuclear fuel.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A separation and receiving apparatus of a hull and a pellet from a spent nuclear fuel rod, the apparatus comprising:
   a driving unit comprising a pin for pressing the spent nuclear fuel rod;
   a slitting unit comprising a blade portion cutting the hull of the nuclear fuel rod the nuclear fuel rod moving according to the pressing of the pin and a separator separating the hull cut by the blade portion and the pellet positioned within the hull; and
   a receiving unit receiving each the hull and the pellet in separate vessels,
   wherein the receiving unit is configured to automatically receive the separated pellet and hull in the separated vessels immediately after leaving the slitting unit during the pressing of the pin,
   wherein the vessel for receiving the separated hull has a plurality of passing holes formed on the side of the pellet vessel at intervals of 120 degrees according to a circumferential direction of the pellet vessel for receiving a respective portion of the separated hull during the pressing of the pin,
   wherein a hull guide guiding the peeled hull by the blade portion is inwardly concaved from the outside of the separator.

2. The apparatus of claim 1, wherein the slitting unit comprises:
   the blade portion provided with a nuclear fuel rod guide passing a cut spent nuclear fuel rod in its center and having a plurality of blades inside the nuclear fuel rod guide to peel the hull formed of the surface of the nuclear fuel rod;
   a nuclear fuel rod support supporting the nuclear fuel rod placed in the nuclear fuel rod guide; and
   the separator connected to the blade portion, separating the peeled hull and the pellet provided therein.

3. The apparatus of claim 1, wherein the slitting unit further comprises a nuclear fuel rod guide vertically passing the nuclear fuel rod, the blade portion comprises a plurality of blade modules provided inside the nuclear fuel rod guide and peeling the hull of the nuclear fuel rod along the length-wise direction of the nuclear fuel rod, and the each blade module comprises at least one blade.

4. The apparatus of claim 1, wherein the slitting unit further comprises a nuclear fuel rod support supporting the nuclear fuel placed in the nuclear fuel rod guide, and the nuclear fuel rod support moves away from the nuclear fuel rod which is descending via an inlet of the slitting unit.

5. The apparatus of claim 2, wherein the blade portion comprises:
   a blade body provided with the nuclear fuel rod guide in its center and an insertion hole where the blade is inserted in its side;
   a plurality of blades inserted in the insertion hole; and
   a supporting plate fixing the blade body to a table.

6. The apparatus of claim 5, comprising blade modules provided with the plurality of blades located according to the transfer direction of the nuclear fuel rod, the blade modules provided in plurality around the blade body.

7. The apparatus of claim 6, wherein the blades are provided in plurality and a first blade first contacting the hull of the nuclear fuel rod forms regularly spaced guide grooves on the surface of the hull and a subsequent blade peels the hull according to the guide grooves.

8. The apparatus of claim 5, wherein the blade is rotatably attached to a blade mounting plate and a blade knob is protruded on the outside of the blade mounting plate.

9. The apparatus of claim 2, wherein the separator is in the shape of a cone and provided with a pellet passing hole in its center to pass the pellet, and a hull guide guiding the peeled hull by the blade portion is inwardly caved in the outside of the separator.

10. The apparatus of claim 2, wherein the receiving unit comprises:
    the hull vessel provided below the separator and capable of receiving the hull; and
    the pellet vessel provided in the center of the hull vessel and receiving the pellet passing through a pellet passing hole formed in the center of the separator.

11. The apparatus of claim 10, wherein the hull vessel comprises:
    an upper cover provided with a hole for the pellet vessel formed in its center and covering the hull vessel; and
    a disk-shaped ring member interposed between the pellet vessel and the upper cover.

12. The apparatus of claim 1, wherein the driving unit comprises:
    a motor producing driving power; a driving power transfer unit connected to the motor to transfer the driving power; and
    a pin connected to the driving power transfer unit to be capable of pressing a cut spent nuclear fuel rod.

13. The apparatus of claim 12, further comprising a motor support having the motor on its upper side, wherein the motor support is attached to a vertical pole formed on a table.

14. The apparatus of claim 12, wherein the driving power transfer unit comprises: a plurality of gears connected to the motor; and a ball screw connected to the gear to transfer the driving power to the pin.

15. The apparatus of claim 12, wherein a limit switch capable of immediately stopping the driving unit by pressing is provided.

16. A separation and receiving apparatus of a spent nuclear fuel rod for separating and storing a hull and a pellet from a nuclear fuel rod, the apparatus comprising:
    a driving unit comprising a pin for downwardly pressing the nuclear fuel rod;
    a slitting unit comprising a nuclear fuel rod guide offering a passage to vertically pass the nuclear fuel rod according to the downward pressing of the pin and a blade module vertically peeling a hull of the nuclear fuel rod passing through the passage of the nuclear fuel rod guide, the blade module comprising a plurality of blades provided according to the passage;
    a separator in the shape of a cone having a passing hole in its center;
    a pellet receiving portion provided below the passing hole; and
    a hull receiving portion provided around the passing hole,
    wherein the receiving portions are configured to automatically receive the separated pellet and hull immediately after leaving the slitting unit during the downward pressing of the pin,
    wherein the receiving portion for receiving the separated hull has a plurality of passing holes formed on the side of the pellet vessel at intervals of 120 degrees according to a circumferential direction of the pellet vessel for receiving a respective portion of the separated hull during the pressing of the pin,
wherein a hull guide guiding the peeled hull by the blade portion is inwardly concaved from the outside of the separator.

17. The apparatus of claim 16, comprising blade modules provided in a row according to the transfer direction of the nuclear fuel rod, the blade modules provided in plurality around the blade body.

18. The apparatus of claim 16, wherein the separator is in the shape of a cone and provided with a pellet passing hole in its center to pass the pellet, and a hull guide guiding the peeled hull in the blade is inwardly caved in the outside of the separator.

19. The apparatus of claim 16, wherein the vessels comprise:
the hull vessel provided below the separator and capable of receiving the hull; and the pellet vessel provided in a center of the hull vessel and receiving the pellet passing through a pellet passing hole formed on a center of the separator.

* * * * *